US012574104B2

(12) United States Patent
Cho et al.

(10) Patent No.: US 12,574,104 B2
(45) Date of Patent: Mar. 10, 2026

(54) METHOD AND APPARATUS FOR ASSIGNING FREQUENCY RESOURCE IN NON-TERRESTRIAL NETWORK

(71) Applicant: Electronics and Telecommunications Research Institute, Daejeon (KR)

(72) Inventors: Yeon Gi Cho, Gongju-si (KR); Bon Jun Ku, Daejeon (KR); Dae Sub Oh, Daejeon (KR); Woo Yeol Yang, Daejeon (KR); Han Shin Jo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 429 days.

(21) Appl. No.: 18/113,996

(22) Filed: Feb. 24, 2023

(65) Prior Publication Data

US 2024/0022317 A1     Jan. 18, 2024

(30) Foreign Application Priority Data

Feb. 25, 2022   (KR) ........................ 10-2022-0024936
Feb. 3, 2023    (KR) ........................ 10-2023-0014803

(51) Int. Cl.
*H04B 7/185*          (2006.01)

(52) U.S. Cl.
CPC ..... *H04B 7/18513* (2013.01); *H04B 7/18539* (2013.01)

(58) Field of Classification Search
CPC ............ H04B 7/18513; H04B 7/18539; H04B 7/18515; H04B 7/2041
See application file for complete search history.

(56) References Cited

U.S. PATENT DOCUMENTS

2003/0054760 A1* 3/2003 Karabinis ............ H04B 7/1853
                                                       455/12.1
2007/0135051 A1* 6/2007 Zheng ................ H04B 7/18513
                                                       455/427
(Continued)

FOREIGN PATENT DOCUMENTS

CN          108183758 A  *  6/2018   ........... H04B 17/382
CN          111031476 A  *  4/2020   ........... H04W 72/52
(Continued)

OTHER PUBLICATIONS

Umehira et al., "Dynamic Channel Assignment Based on Interference Measurement with Threshold for Multi-beam Mobile Satellite Networks", in Proc. 19th Asia-Pacific Conf. Commun. (APCC), Denpasar, Indonesia, Aug. 2013, pp. 688-692. (Year: 2013).*
(Continued)

*Primary Examiner* — Shah M Rahman
(74) *Attorney, Agent, or Firm* — KILE PARK REED & HOUTTEMAN PLLC

(57)                ABSTRACT

An operation method of a satellite in a non-terrestrial network may comprise: determining a frequency resource allocation order for allocating frequency resources to beams in consideration of a frequency band of a terrestrial system and degrees of interference to the terrestrial system; configuring a minimum performance condition for maintaining a service of the non-terrestrial network, the minimum performance condition being applied to each of the beams; configuring an operating condition of a multi-agent deep reinforcement learning for each beam controller of the satellite; and controlling the each beam controller to sequentially allocate the frequency resources to a managed beam according to the frequency resource allocation order while considering the minimum performance condition.

12 Claims, 6 Drawing Sheets

(56) References Cited

U.S. PATENT DOCUMENTS

| | | | |
|---|---|---|---|
| 2014/0307701 A1* | 10/2014 | Markwart | H04W 72/53 |
| | | | 370/329 |
| 2016/0277095 A1 | 9/2016 | Marsh et al. | |
| 2019/0239082 A1* | 8/2019 | Ravishankar | H04B 7/18528 |
| 2019/0288378 A1* | 9/2019 | DiFonzo | H01Q 25/008 |
| 2020/0167611 A1 | 5/2020 | Yoon et al. | |
| 2020/0184383 A1 | 6/2020 | Mehta et al. | |
| 2020/0380401 A1 | 12/2020 | Walton et al. | |
| 2021/0153219 A1 | 5/2021 | Sana et al. | |
| 2021/0194571 A1* | 6/2021 | Ma | H04B 7/18504 |
| 2021/0200923 A1 | 7/2021 | Jang et al. | |
| 2021/0306130 A1 | 9/2021 | Smache et al. | |
| 2022/0095309 A1* | 3/2022 | MolavianJazi | H04W 72/541 |
| 2022/0104213 A1 | 3/2022 | Song et al. | |
| 2022/0124735 A1* | 4/2022 | Rasool | H04B 7/18543 |
| 2022/0338230 A1* | 10/2022 | Yu | H04L 5/0053 |
| 2023/0209370 A1* | 6/2023 | Pateromichelakis | G06N 20/00 |
| | | | 370/328 |
| 2023/0246724 A1* | 8/2023 | Pateromichelakis | |
| | | | H04W 72/0453 |
| | | | 370/329 |
| 2024/0155451 A1* | 5/2024 | Zhu | H04W 72/541 |
| 2024/0275466 A1* | 8/2024 | Jassal | H04B 7/06964 |

FOREIGN PATENT DOCUMENTS

| | | | | |
|---|---|---|---|---|
| EP | 4207902 A1 * | 7/2023 | ......... | H04B 7/18517 |
| KR | 10-2202786 | 1/2021 | | |

OTHER PUBLICATIONS

Park et al., "Feasibility of Coexistence of Mobile-Satellite Service and Mobile Service in Cofrequency Bands", ETRI Journal, vol. 32, No. 2, Apr. 2010, pp. 255-264 (Year: 2010).*

Kodheli et al., "Satellite Communications in the New Space Era: A Survey and Future Challenges", IEEE Communications Surveys & Tutorials ( vol. 23, Issue: 1, Firstquarter 2021), pp. 70-109 (Year: 2021).*

Liu et al., "Deep Reinforcement Learning Based Dynamic Channel Allocation Algorithm in Multibeam Satellite Systems", IEEE Access, Apr. 18, 2018, pp. 15733-15742, vol. 6.

* cited by examiner

320 memory

| ROM | RAM |

310 processor

370 input interface device — 340 output interface device — 350 storage device — 360 transceiver — 330

FIG. 7

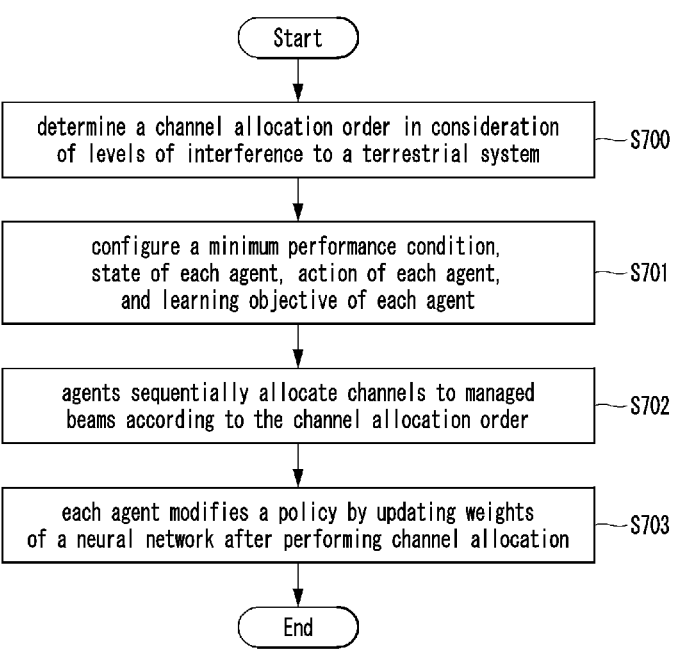

Start determine a channel allocation order in consideration
of levels of interference to a terrestrial system    —S700 configure a minimum performance condition,
state of each agent, action of each agent,
and learning objective of each agent    —S701 agents sequentially allocate channels to managed
beams according to the channel allocation order    —S702 each agent modifies a policy by updating weights
of a neural network after performing channel allocation    —S703

End

METHOD AND APPARATUS FOR ASSIGNING FREQUENCY RESOURCE IN NON-TERRESTRIAL NETWORK

CROSS-REFERENCE TO RELATED APPLICATIONS

This application claims priority to Korean Patent Applications No. 10-2022-0024936, filed on Feb. 25, 2022, and No. 10-2023-0014803, filed on Feb. 3, 2023, with the Korean Intellectual Property Office (KIPO), the entire contents of which are hereby incorporated by reference.

BACKGROUND

1. Technical Field

Exemplary embodiments of the present disclosure relate to a frequency resource allocation technique in a non-terrestrial network, and more specifically, to a technique for allocating frequency resources in a non-terrestrial network using multiple cells under a limited bandwidth condition.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Such the communication network may provide communication services to terminals located in terrestrial sites, and may be a terrestrial network. Recently, the demand for communication services for airplanes, drones, satellites, etc. located not only in the terrestrial sites but also in non-terrestrial spaces is increasing. Accordingly, techniques for a non-terrestrial network (NTN) are being under discussion. The NTN may be implemented based on terrestrial network technology. For example, in the NTN, communication between a satellite and a communication node located in a terrestrial site or between non-terrestrial communication nodes (e.g., airplanes, drones, etc.) may be performed based on terrestrial network technology. In the NTN, a satellite may perform functions of a base station in a terrestrial network.

Such the NTN is receiving a lot of attention due to its excellent performance in various aspects, such as a wide coverage, long communication distance, and high speed. Accordingly, many countries and companies are planning new communication services using NTNs. However, since frequency resources are limited, an interference problem with the existing services may occur due to the appearance of the new communication services. In particular, since service coverages of NTNs using low earth orbit (LEO) satellites are variable according to a time and movement paths of the satellites, and a probability of encountering another satellite or terrestrial service operating on the same or adjacent channel during movement is high, a frequency sharing problem between two or more services may occur in this case.

SUMMARY

Exemplary embodiments of the present disclosure are directed to providing a method and an apparatus for allocating frequency resources in a non-terrestrial network using multiple cells under a limited bandwidth condition, thereby allowing the frequency resources to be shared.

According to a first exemplary embodiment of the present disclosure, an operation method of a satellite in a non-terrestrial network may comprise: determining a frequency resource allocation order for allocating frequency resources to beams in consideration of a frequency band of a terrestrial system and degrees of interference to the terrestrial system; configuring a minimum performance condition for maintaining a service of the non-terrestrial network, the minimum performance condition being applied to each of the beams; configuring an operating condition of a multi-agent deep reinforcement learning for each beam controller of the satellite; and controlling the each beam controller to sequentially allocate the frequency resources to a managed beam according to the frequency resource allocation order while considering the minimum performance condition.

The determining of the frequency resource allocation order may comprise: calculating a distance between a cell center of the terrestrial system and a cell center of a terrestrial cell formed by each of the beams; and determining the frequency resource allocation order in consideration of a level at which the distance affects the degree of interference.

In the determining of the frequency resource allocation order, as the distance decreases, the satellite may give a priority in the frequency resource allocation order to a beam forming a terrestrial cell corresponding to the distance.

The minimum performance condition may be a minimum signal-to-interference-plus-noise-ratio (SINR) condition of uplink signals.

The configuring of the operating condition for the multi-agent deep reinforcement learning may comprise: configuring each beam controller of the satellite to use an interference power between terrestrial cells, which is observed for a beam managed by each beam controller, as a state constituting the operating condition; allowing each beam controller of the satellite to perform an operation of allocating one frequency resource among frequency resources allowed for the satellite as an action constituting the operating condition, so as to achieve a learning objective constituting the operating condition under the state; and configuring the learning objective constituting the operating condition so that a higher reward is obtained as a cumulative interference to the terrestrial system is reduced according to the action.

The operation method may further comprise configuring a penalty to be given when the action does not satisfy a minimum performance condition of the non-terrestrial network as the learning objective constituting the operating condition.

The operation method may further comprise modifying, by each beam controller of the satellite, a policy by updating weights of a neural network of the each beam controller.

According to a second exemplary embodiment of the present disclosure, a satellite of a non-terrestrial network may comprise a processor, wherein the processor may cause the satellite to perform: determining a frequency resource allocation order for allocating frequency resources to beams in consideration of a frequency band of a terrestrial system and degrees of interference to the terrestrial system; configuring a minimum performance condition for maintaining a service of the non-terrestrial network, the minimum performance condition being applied to each of the beams; configuring an operating condition of a multi-agent deep reinforcement learning for each beam controller of the satellite; and controlling the each beam controller to sequentially allocate the frequency resources to a managed beam according to the frequency resource allocation order while considering the minimum performance condition.

In the determining of the frequency resource allocation order, the processor may further cause the satellite to perform: calculating a distance between a cell center of the terrestrial system and a cell center of a terrestrial cell formed by each of the beams; and determining the frequency resource allocation order in consideration of a level at which the distance affects the degree of interference.

In the configuring of the operating condition for the multi-agent deep reinforcement learning, the processor may further cause the satellite to perform: configuring each beam controller of the satellite to use an interference power between terrestrial cells, which is observed for a beam managed by each beam controller, as a state constituting the operating condition; allowing each beam controller of the satellite to perform an operation of allocating one frequency resource among frequency resources allowed for the satellite as an action constituting the operating condition, so as to achieve a learning objective constituting the operating condition under the state; and configuring the learning objective constituting the operating condition so that a higher reward is obtained as a cumulative interference to the terrestrial system is reduced according to the action.

The processor may further cause the satellite to perform: configuring a penalty to be given when the action does not satisfy a minimum performance condition of the non-terrestrial network as the learning objective constituting the operating condition.

The processor may further cause the satellite to perform: modifying, by each beam controller of the satellite, a policy by updating weights of a neural network of the each beam controller.

According to the present disclosure, when a satellite recognizes an interfered source, frequency resources can be allocated to increase spectral efficiency by reducing interference to the interfered source while maintaining the minimum performance of the NTN. According to the present disclosure, the satellite can allocate channels so that frequency resources are shared with a terrestrial service at the expense of the communication performance of the NTN.

BRIEF DESCRIPTION OF DRAWINGS

FIG. 1 is a conceptual diagram illustrating a first exemplary embodiment of a non-terrestrial network.

FIG. 2 is a conceptual diagram illustrating a second exemplary embodiment of a non-terrestrial network.

FIG. 7 is a flowchart illustrating a first exemplary embodiment of a frequency resource allocation method in a non-terrestrial network.

DETAILED DESCRIPTION OF THE EMBODIMENTS

Figures 3, 4:
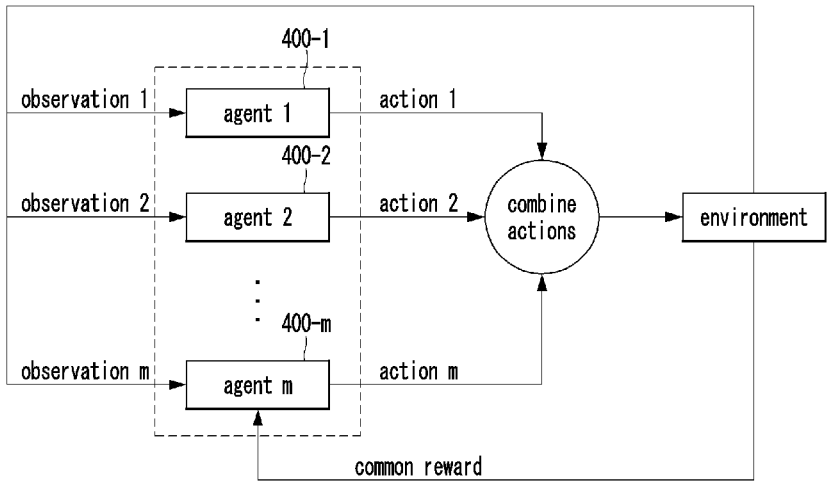
FIG. 3 is a block diagram illustrating a first exemplary embodiment of an entity constituting a non-terrestrial network.
FIG. 4 is a conceptual diagram illustrating a first exemplary embodiment of a multi-agent deep reinforcement learning method.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication system may be a non-terrestrial network (NTN), a 4G communication network (e.g., long-term evolution (LTE) communication network), a 5G communication network (e.g., new radio (NR) communication network), a 6G communication network, or the like. The 4G communication network, 5G communication network, and 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

Figure 1:
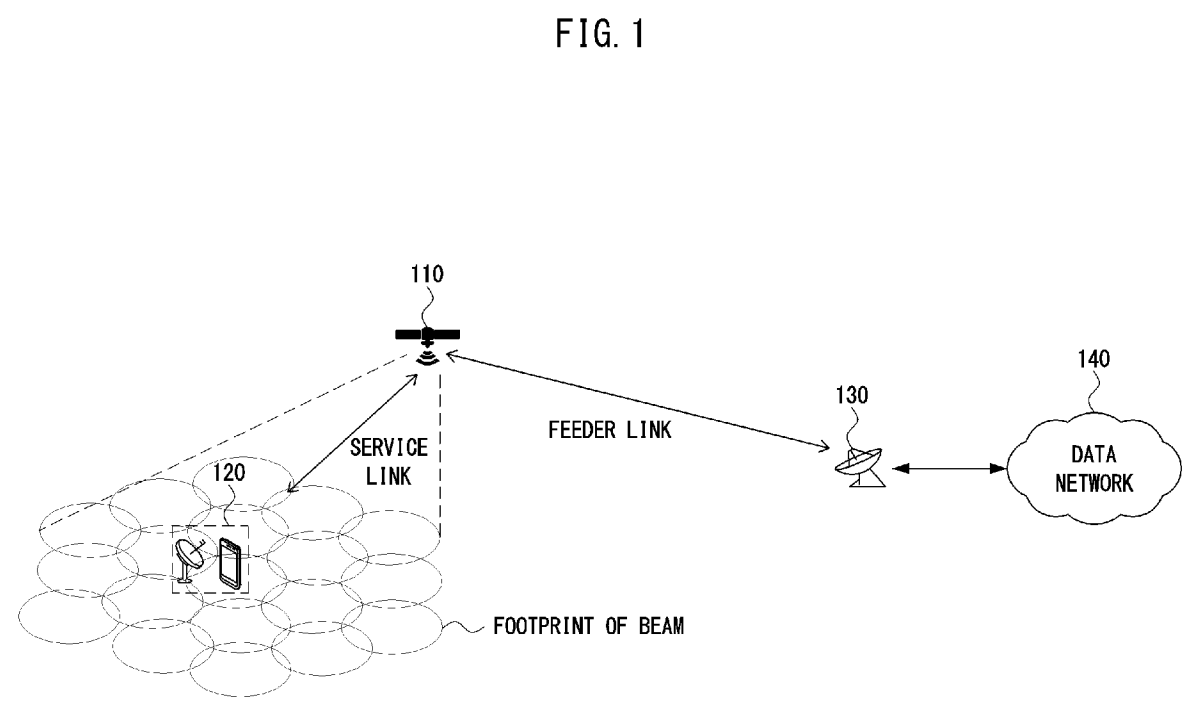

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., a user equipment (UE) or a terminal) located on a terrestrial site and a communication node (e.g., an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g., downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g., base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g., AMF, UPF, SMF, and the like) may be performed based on an NG-C/U interface.

Figure 2:
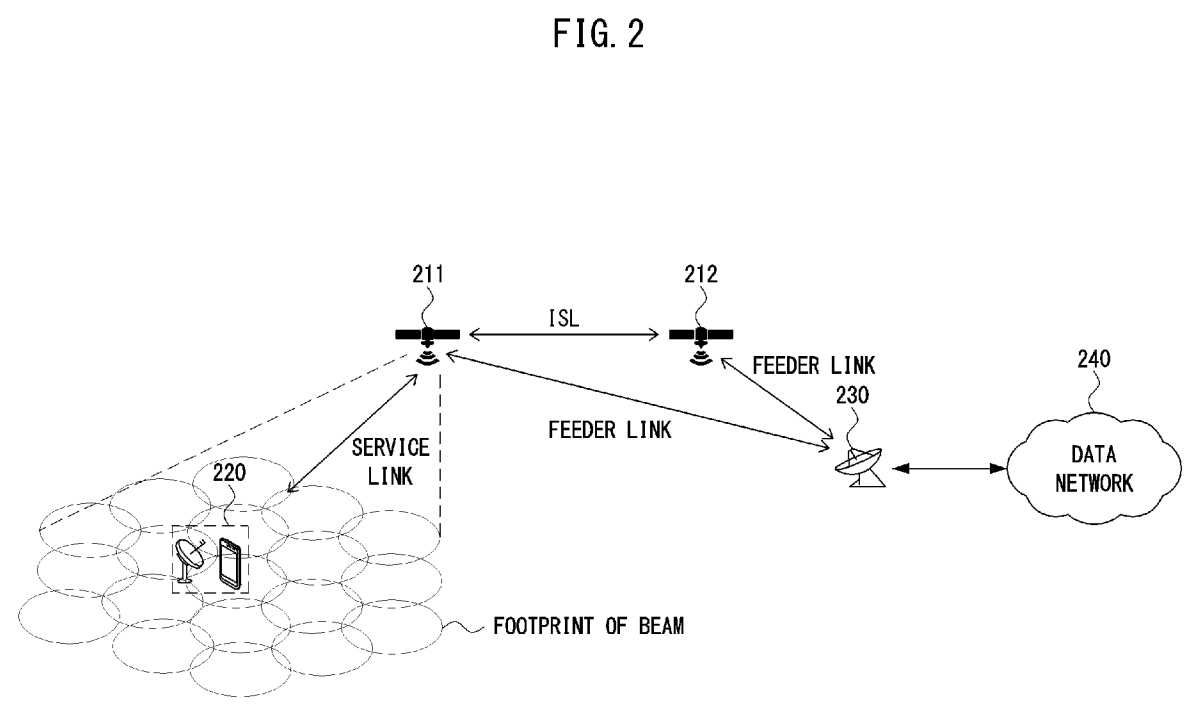

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g., base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g., AMF, UPF, SMF, and the like) may be performed based on an NG-C/U interface.

Meanwhile, entities (e.g., satellites, communication nodes, gateways, etc.) constituting the NTNs shown in FIGS. 1 and 2 may be configured as follows.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other.

However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

|  | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g., a GEO satellite that supports a transparent function), this may be referred to as 'scenario A'. When the satellites 211 and 212 in the NTN shown in FIG. 2 are GEO satellites (e.g., GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
|---|---|---|
| Altitude | 35,786 km | 600 km 1,200 km |
| Spectrum (service link) | <6 GHz (e.g., 2 GHz) >6 GHz (e.g., DL 20 GHz, UL 30 GHz) | |
| Maximum channel bandwidth capability (service link) | 30 MHz for band <6 GHz 1 GHz for band >6 GHz | |
| Maximum distance between satellite and communication node (e.g., UE) at the minimum elevation angle | 40,581 km | 1,932 km (altitude of 600 km) 3,131 km (altitude of 1,200 km) |

TABLE 2-continued

| | Scenarios A and B | Scenarios C and D |
|---|---|---|
| Maximum round trip delay (RTD) (only propagation delay) | Scenario A: 541.46 ms (service and feeder links) Scenario B: 270.73 ms (only service link) | Scenario C: (transparent payload: service and feeder links) −5.77 ms (altitude of 60 0 km) −41.77 ms (altitude of 1,200 km) Scenario D: (regenerative payload: only service link) −12.89 ms (altitude of 600 km) −20.89 ms (altitude of 1,200 km) |
| Maximum delay variation within a single beam | 16 ms | 4.44 ms (altitude of 600 km) 6.44 ms (altitude of 1,200 km) |
| Maximum differential delay within a cell | 10.3 ms | 3.12 ms (altitude of 600 km) 3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Such the NTN is receiving a lot of attention due to its excellent performance in various aspects, such as a wide coverage, long communication distance, and high speed. Accordingly, many countries and companies are planning new communication services using NTNs. However, since frequency resources are limited, an interference problem with the existing services may occur due to the appearance of the new communication services. In particular, since service coverages of NTNs using low earth orbit (LEO) satellites are variable according to a time and movement paths of the satellites, and a probability of encountering another satellite or terrestrial service operating on the same or adjacent channel during movement is high, a frequency sharing problem between two or more services may occur in this case.

In order to solve the above-described problem, a communication system based on an NTN may consider a method of allocating appropriate frequency resources to multi-beams of a satellite to reduce interference affecting interfered sources. However, there may be numerous frequency resource combinations depending on the number of beams and the number of selectable frequency resources of the NTN, and the frequency resource combinations may vary according to changes in parameters such as a minimum communication performance criterion of the satellite, locations of the interfered sources, and a frequency band. Since an optimal frequency resource combination may vary due to various factors as described above, it may be very complicated to resolve such the problems.

Recently, several studies are being performed using a multi-agent reinforcement learning (MARL) algorithm to solve the above-described kind of optimization problem. In the case of the general MARL algorithm, all agents may be trained simultaneously through interactions therebetween. In this case, a reward received by each agent and state transition thereof may not depend only on an action selected by itself, and actions selected by other agents may also be considered. Therefore, since the reward and state transition according to the action of each agent do not depend only on a previous state and a previous action of the agent, a non-stationarity may occur. The most common way to solve this problem may be to assume that each agent knows information about the observations and actions of other agents as well as those of itself. However, in this case, the communication system may require a large memory size because more data than before should be stored, and practicality may be reduced due to too many assumptions in an actual communication environment.

Accordingly, when the communication system based on the NTN allocates frequency resources, a new frequency resource allocation method for a satellite system may be required for the purpose of frequency sharing in consideration of the parameters of the interfered sources and the communication requirements of the satellite system.

FIG. 4 is a conceptual diagram illustrating a first exemplary embodiment of a multi-agent deep reinforcement learning method.

Referring to FIG. 4, in the multi-agent deep reinforcement learning method, all agents 400-1 to 400-m may observe a current state from an environment, simultaneously select actions, and receive a common reward. In the multi-agent deep reinforcement learning method described above, since the reward and state transitions do not depend only on the previous states and the actions of the agents, a non-stationarity problem may occur.

The deep Q learning (DQN) may update a neural network basically through learning, and through the neural network, a policy by which the agent determines an action under a given state may be generated. However, in the multi-agent deep reinforcement learning method of FIG. 4, the agents may simultaneously select actions and simultaneously update policies by receiving the common reward. In this case, the reward and state transition according to each agent's action may be affected not only by its own action but also by the actions of other agents. Therefore, even if each agent performs the same action, it may lead to a non-stationarity problem because it receives a different reward and experiences a different state transition according to the actions of other agents.

In order to solve this non-stationary problem, each agent may need information about other agents' observations and actions. However, such information may increase exponentially according to the increase in the number of agents and the number of actions that each agent can select. As the related information increases exponentially, it may be difficult to increase the number of agents and actions. That is, there may be difficulties in increasing the number of agents and the number of selectable actions. In other words, in the multi-agent deep reinforcement learning method of FIG. 4, a problem of scalability that has limitations in extending the number of agents and the number of selectable actions may occur.

Meanwhile, in an actual communication network, most agents may only be able to perform partial observation. However, in order to solve the non-stationarity problem in the multi-agent deep reinforcement learning method of FIG. 4, each agent need to be able to observe actions of all other agents. Therefore, since the communication system should be able to predict the actions and policies of other agents through limited information in an actual communication environment, and should be able to solve the non-stationary problem through the prediction, it may be a fatal disadvantage in the practical use of the algorithm.

Figure 5:
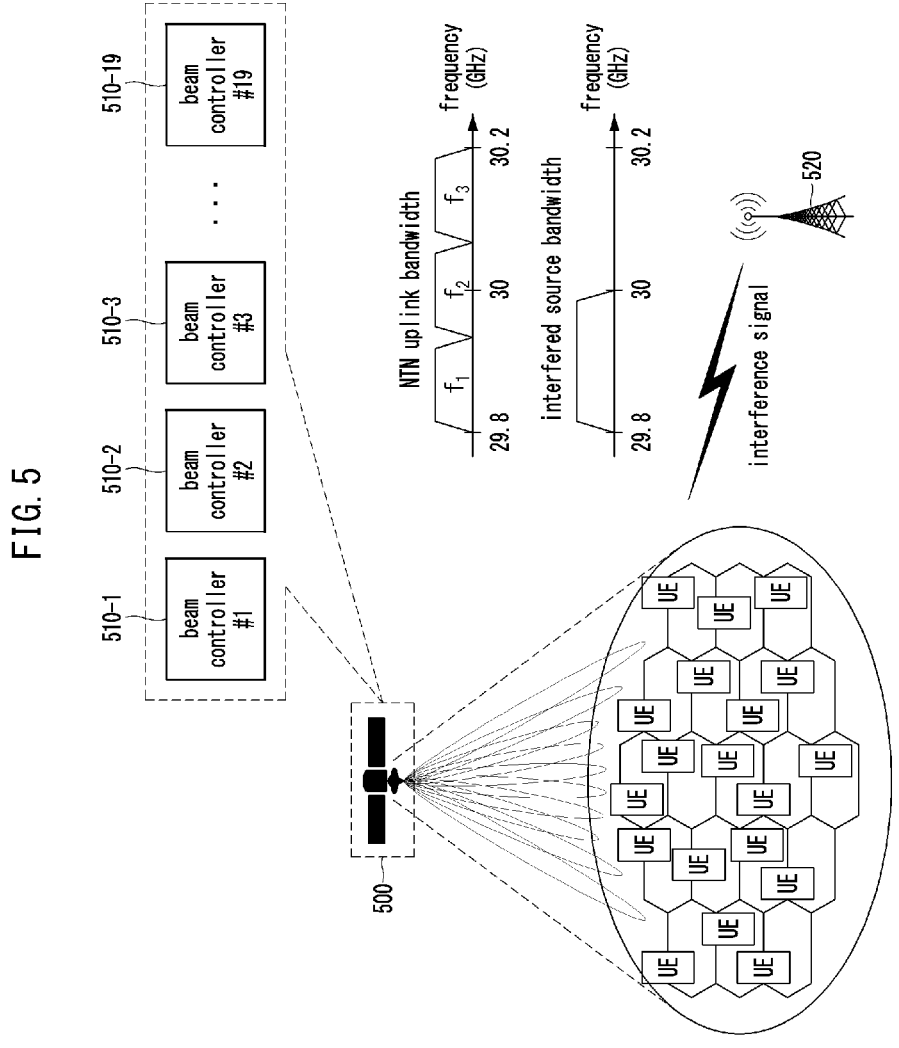
FIG. 5 is a conceptual diagram illustrating a third exemplary embodiment of a non-terrestrial network.

FIG. 5 is a conceptual diagram illustrating a third exemplary embodiment of a non-terrestrial network.

Referring to FIG. 5, in the NTN, a satellite 500 may provide services to N terrestrial cells using N beams and F channels. The satellite 500 may allocate one of the F channels to each terrestrial cell using beam controllers 510-1 to 510-19. A channel allocated to the n-th terrestrial cell may be $c_n$, and $c_n$ may be defined as $c_n \in \{1, \ldots, F\}$. Here, N and F may be positive integers. In FIG. 5, N may be 19 as an example, and F may be 3 as an example.

In the above-described situation, terminals (i.e., user equipments (UEs) may transmit uplink signals to the satellites 500. In this case, the UEs may use the same frequency band as that used by a terrestrial system 520, which is an interfered source. Accordingly, the UEs may give interferences to a terrestrial service provided by the terrestrial system 520 when the UEs transmit signals to the satellite 500.

Meanwhile, in the satellite 500, an antenna direction of each beam may be toward a center of a terrestrial cell. K UEs may be randomly distributed in each terrestrial cell. The UE may perform communication through one of K subchannels obtained by dividing a channel allocated to each terrestrial cell. Because K UEs respectively use different subchannels, intra-cell interference may not be considered when they simultaneously perform communications. Here, K may be a positive integer. When a channel is allocated to each of all the terrestrial cells, a signal-to-interference-plus-noise-ratio (SINR) $\gamma_{n,k}(\mathbb{C})$ of an uplink signal of the k-th UE distributed in the n-th terrestrial cell may be calculated by Equation 1 below. Here, k may be defined as $k \in \{1, \ldots, K\}$. $\mathbb{C}$ may be a combination of channels allocated to N beams, and $\mathbb{C}$ may be defined as $\mathbb{C} \in \{c_1, \ldots, c_N\}$.

$$\gamma_{n,k}(\mathbb{C}) = \frac{S_{n,k}}{\sigma_{SS}^2 + \sum_{\substack{m \in M \\ m \neq n}} \delta_{n,m} \cdot I_{n,m,k}} \qquad \text{[Equation 1]}$$

Here, $S_{n,k}$ may be a power of a signal received from the k-th UE distributed in the n-th terrestrial cell using the n-th bean of the satellite. This signal power may be calculated using Equation 2 below. Here, $P_{n,k}$ may be a transmit power of the k-th UE distributed in the n-th terrestrial cell. $G_{UE,n,k}$ may be a transmit antenna gain of the k-th UE distributed in the n-th terrestrial cell. In addition, $G_{SS,n,k}$ may be a receive antenna gain when a signal is received from the k-th UE distributed in the n-th terrestrial cell using the n-th beam of the satellite. $L_{n,k}$ may be a path loss between the satellite and the k-th UE distributed in the n-th terrestrial cell. In addition, $H_{n,k}$ may mean a small-scale fading between the satellite and the k-th UE distributed in the n-th terrestrial cell. An average of $$H_{n,k}$$

may be 0, and $H_{n,k}$ may follow a lognormal distribution with a standard deviation of 0.5 dB.

$$S_{n,k} = P_{n,k} \cdot G_{UE,n,k} \cdot G_{SS,n,k} \cdot L_{n,k} \cdot H_{n,k} \qquad \text{[Equation 2]}$$

Meanwhile, in Equation 1, $\sigma_{SS}^2$ may mean a reception noise power of the satellite. In addition, $\delta_{n,m}$ is a binary indicator and may be defined as 1 when the n-th terrestrial cell and the m-th terrestrial cell use the same channel, and may be defined as 0 otherwise. In addition, $I_{n,m,k}$ may be an interference between terrestrial cells, which is received from the k-th UE distributed in the m-th terrestrial cell when the satellite receives signals from the k-th UE distributed in the n-th terrestrial cell through the n-th beam of the satellite. Such the interference between terrestrial cells may be calculated by Equation 3 below.

$$I_{n,m,k} = P_{m,k} \cdot G_{UE,n,m,k} \cdot G_{SS,n,m,k} \cdot L_{m,k} \cdot H_{m,k} \qquad \text{[Equation 3]}$$

Here, $P_{m,k}$ may be a transmit power of the k-th UE distributed in the m-th terrestrial cell. $G_{UE,n,m,k}$ may be an antenna gain of the k-th UE distributed in the m-th terrestrial cell. In addition, $G_{SS,n,m,k}$ may be a receive antenna gain when the satellite receives signals from the k-th UE distributed in the m-th terrestrial cell using the n-th beam of the satellite. $L_{m,k}$ may be a path loss between the satellite and the k-th UE distributed in the m-th terrestrial cell. In addition, $H_{m,k}$ may mean a small-scale fading between the satellite and the k-th UE distributed in the m-th terrestrial cell. An average of $H_{m,k}$ may be 0, and $H_{m,k}$ may follow a lognormal distribution with a standard deviation of 0.5 dB.

Meanwhile, an interference power of the k-th UE for the terrestrial system may be calculated as in Equation 4 below. Such the interference power may be calculated after calculating SINRs of uplink signals of UEs distributed in all terrestrial cells and determining whether the minimum communicable SINR of the NTN is satisfied. In this case, the terrestrial system may be located at a point at a distance (x, y) away from a cell center of the satellite. In this case, the distance may be expressed in units of kilometers.

$$I_{VS,n,k} = P_{n,k} \cdot G_{UE,n,k}^{VS} \cdot G_{VS} \cdot PL_{n,k} \cdot \alpha_{n,k} \qquad \text{[Equation 4]}$$

Here, $$G_{UE,n,k}^{VS}$$

may be a transmit antenna gain from the k-th UE distributed in the n-th terrestrial cell toward the terrestrial system. $G_{VS}$ may be a receive antenna gain of the terrestrial system. $PL_{n,k}$ may be the path loss between the k-th UE distributed in the n-th terrestrial cell and the terrestrial system. The path loss may be calculated using the ITU-R P.452 model, which is a path loss model proposed by the International Telecommunication Union (ITU). $\alpha_{n,k}$ may be a frequency-dependent rejection (FDR) between the UE and the terrestrial system, which may be a ratio at which the bandwidths of the interferer (i.e., UE) and the interfered source (i.e. terrestrial system) overlap with each other. In the present disclosure, as shown in FIG. 5 for simulation, it may be assumed that the uplink of the NTN uses three channels (e.g., CH1 ($f_1$), CH2 ($f_2$), CH3 ($f_3$)) within a 29.8-30.2 GHz band, and the terrestrial system uses a 29.8-30 GHz band. Accordingly, $\alpha_{n,k}$ of the UE distributed in the terrestrial cell to which one of the channels is allocated may be 1, or 0.

Meanwhile, an object of the present disclosure may be to find a non-terrestrial channel set $\mathbb{C}$ that minimizes a cumulative interference to an interfered source while satisfying the minimum SINR condition of the NTN. This object of the present disclosure may be formulated as in Equation 5.

$$P1: \min_{\mathbb{C}} I_{agg} = \sum_{n=1}^{N} \rho(c_n) \sum_{k=1}^{K} I_{VS,n,k} \qquad \text{[Equation 5]}$$

$$\text{s.t. } C1: \gamma_{n,k} \geq \gamma_{th}, \forall n \in \{1, \ldots, N\}, \forall k \in \{1, \ldots, K\}$$

$$C2: \rho(c_n) \in \{0, 1\}$$

Here, $I_{agg}$ may be a cumulative interference received by the terrestrial system. $\gamma_{th}$ may be the minimum SINR condition for maintaining the service of the NTN. $\rho(c_n)$ may represent a binary indicator for identifying whether the bandwidth allocated to the n-th terrestrial cell and the bandwidth of the terrestrial system overlap. In this case, $\rho(c_n)$ may be defined as 1 when the bandwidth of the n-th terrestrial cell and the bandwidth of the terrestrial system overlap, and may be defined as 0 otherwise.

Figure 6:
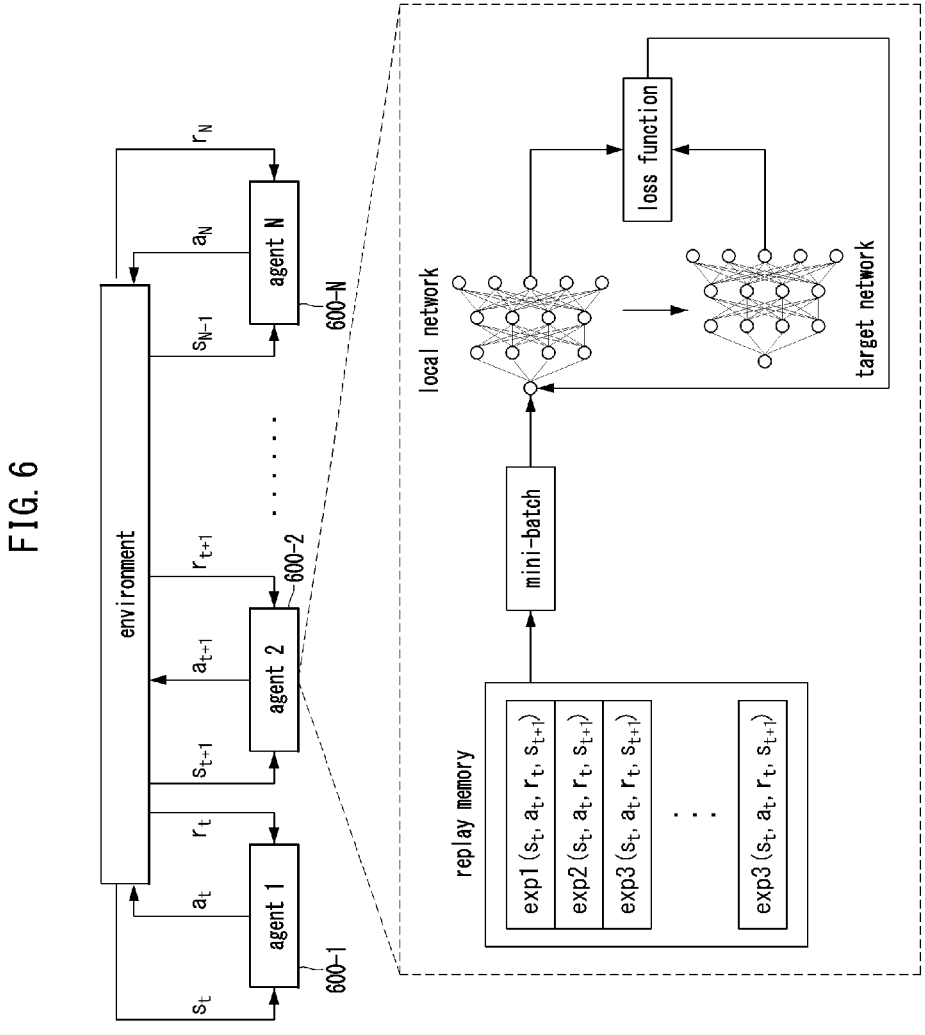
FIG. 6 is a conceptual diagram illustrating a second exemplary embodiment of a multi-agent deep reinforcement learning method.

FIG. 6 is a conceptual diagram illustrating a second exemplary embodiment of a multi-agent deep reinforcement learning method.

Referring to FIG. 6, in the multi-agent deep reinforcement learning method, agents 600-1 to 600-N may sequentially observe a current state from an environment, select actions, and receive a reward. That is, in a time step t, the t-th agent may perform an action a t through a state space $s_t$ and may receive a reward $r_t$. Thereafter, the state space may be changed to $s_{t+1}$, and one episode may end when it progresses to a step T. Here, T may be a positive integer. Here, t may be defined as $t \in \{1, \ldots, T\}$.

The training of the agents may proceed in the order of beams that cause higher interference to the terrestrial system. In this case, T may be N. Accordingly, one episode may end when all agents select actions. Through this process, each agent may learn a policy and update its neural network. For example, in the present disclosure, the above learning may be iterated until 2000 episodes are completed. In the present disclosure, the state space observed by the t-th agent may be a cumulative interference received and accumulated from UEs distributed in each channel with respect to the t-th beam. Such the cumulative interference $s_t$ may be calculated by Equation 6 below.

$$s_t = \left\{ \sum_{\substack{m \neq M \\ m \neq t}} \sum_{k=1}^{K} I_{t,m,k} \right\}_{j=1,\ldots,F} \qquad \text{[Equation 6]}$$

Here, $M_j$ may be a set of terrestrial cells allocated to the j-th channel. The agent's action set $a_t$ may be equal to the channel set, $a_t$ may be defined as $a_t = \{1, 2, \ldots, F\}$. The t-th agent may allocate a channel to a terrestrial cell by selecting one action, and receive a reward $r_t$. In this case, the reward $r_t$ may be defined as in Equation 7 below.

$$r_t = \begin{cases} 10\log_{10}\left(\dfrac{1}{I_{agg}}\right), & \gamma_{n,k}(\mathbb{C}) \geq \gamma_{th}, \forall n \in N \\ -100 \cdot N_{th}, & \text{otherwise} \end{cases} \qquad \text{[Equation 7]}$$

Here, $N_{th}$ may be the number of terrestrial cells that do not satisfy $\gamma_{th}$. Through this, each agent may first satisfy the SINR condition of the NTN, and then proceed with learning in a direction that can minimize the cumulative interference.

Meanwhile, each of the agents 600-1 to 600-N may include a replay memory, mini-batch(es), a local network, and a target network. Each agent may be trained using two separate neural networks, the local network and the target network. Each agent may store observation data in the replay memory for each step, and may perform sampling using the mini-batch. In addition, each agent may update weights of the local network using the sampled k mini-batches. In this case, a loss function may use a mean square error (MSE). Each agent may fix weights of the target network for a certain period of time, and update the weights of the target network in a way of copying the weights of the local network.

FIG. 7 is a flowchart illustrating a first exemplary embodiment of a frequency resource allocation method in a non-terrestrial network.

Referring to FIG. 7, in a frequency resource allocation method in the NTN, a satellite may determine an order of beams (i.e., beams of the satellite) to which channels are allocated in consideration of degrees of interference (i.e., levels of interference) to a terrestrial system (S700). In this case, the degree of interference may be proportional to a distance between a cell center of the terrestrial system and a cell center of a terrestrial cell of the satellite. Thus, the satellite may determine the order of beams to which channels are allocated based on the location of the terrestrial system. In other words, the satellite may determine the order of terrestrial cells to which channels are allocated according to the location of the terrestrial system. In other words, the satellite may determine an order of operations of agents operating to allocate channels based on the location of the terrestrial system. For example, after calculating a distance between the cell center of the terrestrial system and a cell center of each of the terrestrial cells, the satellite may determine the order of beams for allocating channels according to proximities to the terrestrial system. That is, the satellite may be configured to preferentially allocate a channel to a beam allocated to a terrestrial cell as a cell center of the terrestrial cell approaches the cell center of the terrestrial system. In other words, as the cell center of the terrestrial cell approaches the cell center of the terrestrial system, an agent managing a beam allocated to the corresponding terrestrial cell may preferentially allocate a channel.

In this manner, when the satellite trains agents in charge of the respective beams, the training may proceed in the order of beams having cells close to the interfered source. Through this, the satellite may have a higher interference mitigation performance as a result of relieving constraints in selecting an operation due to a condition as the beam has a greater influence on interference.

Meanwhile, the satellite may configure a minimum performance index, configure an action of each agent, configure a state of each agent, configure a reward for each agent, and configure a learning objective of each agent (S701). That is, the satellite may configure a minimum performance condition for maintaining services of the NTN. For example, the minimum performance condition may be 13 dB or 14 dB as a minimum SINR condition. In addition, the satellite may configure each agent to use a cumulative interference as a state, which is obtained by accumulating interferences received by the respective channels from UEs located in neighboring cells of a terrestrial cell for which each agent is responsible. That is, the satellite may configure an interference power between terrestrial cells to be used as a state for each beam. In other words, the satellite may configure a cumulative interference obtained by accumulating interferences experienced by the respective selectable channels from signals transmitted by UEs located in other terrestrial cells to be used as a state. In other words, the satellite may configure each agent to use a cumulative interference as a state, which is obtained by accumulating interferences experienced by the respective selectable channels from signals transmitted by UEs located in other terrestrial cells. In other words, the satellite may configure a cumulative interference obtained by accumulating interferences experienced by the respective channels from signals transmitted by UEs located in other terrestrial cells to be used as an input. Here, the action, state, and learning objective may be collectively referred to as operating conditions of the multi-agent deep reinforcement learning.

In addition, the satellite may configure the action of each agent to an operation of selecting one channel from channels allowed to be used by the satellite (i.e., allowed channels). In addition, the satellite may configure a learning objective so that a reward such as Equation 7 is given to each agent. Then, the satellite may configure a policy so that each agent can satisfy the minimum performance condition for each beam and a reward is maximized by allocating channels in a direction that minimizes a cumulative interference to the interfered source (i.e., terrestrial system).

Then, the respective agents of the satellite may allocate channels to managed beams by sequentially acting according to the order of allocating channels (S702). Then, each agent may modify the policy by updating the weights of the neural network after performing the channel allocation (S703). In this case, each of the agents may sequentially perform learning using two separate neural networks including the local network and the target network. Each agent may store observation data in the replay memory for each step, and may randomly sample the stored observation data using the mini-batch. In addition, each agent may update the weights of the local network using the sampled mini-batch. In this case, a loss function may use mean square error (MSE). Each agent may fix the weights of the target network for a certain period of time and update the weights of the target network in a way of copying the weights of the local network. In addition, each agent may modify the policy by updating the weights. Here, the observation data may be state, action, reward, and next state.

Meanwhile, in the MARL algorithm proposed in the present disclosure, the agents may be trained sequentially. Therefore, the state observed by the current agent through the environment may include the previous actions of other agents and state transitions in accordance therewith. In addition, since the agents do not act simultaneously, the non-stationary problem can be solved without information on other agents, and even when the number of agents increases, additional information on other agents is not required, and learning is possible with a smaller memory size than the existing algorithms. Thus, a scalability problem may not occur.

Additionally, as shown in Equation 6, the state observed by each agent through the environment may be defined as a cumulative interference received by the agent's beam from UEs distributed in other cells through the respective channels. Accordingly, the MARL algorithm proposed in the present disclosure may have the advantage that it can be sufficiently utilized in a practical communication network by solving a partial observability problem.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a satellite in a non-terrestrial network, the operation method comprising:

determining a frequency resource allocation order for allocating frequency resources to beams in consideration of a frequency band of a terrestrial system and degrees of interference to the terrestrial system;

configuring a minimum performance condition for maintaining a service of the non-terrestrial network, the minimum performance condition being applied to each of the beams;

configuring an operating condition of a multi-agent deep reinforcement learning for each beam controller of the satellite; and controlling the each beam controller to sequentially allocate the frequency resources to a managed beam according to the frequency resource allocation order while considering the minimum performance condition, wherein the operating condition includes a state and a learning objective, the state is set based on an interference power observed between terrestrial cells for the managed beam by the each beam controller, and the learning objective is configured such that a higher reward is obtained as a cumulative interference to the terrestrial system is reduced according to an action.

2. The operation method according to claim 1, wherein the determining of the frequency resource allocation order comprises:

calculating a distance between a cell center of the terrestrial system and a cell center of a terrestrial cell formed by each of the beams; and determining the frequency resource allocation order in consideration of a level at which the distance affects the degree of interference.

3. The operation method according to claim 2, wherein in the determining of the frequency resource allocation order, as the distance decreases, the satellite gives a priority in the frequency resource allocation order to a beam forming a terrestrial cell corresponding to the distance.

4. The operation method according to claim 1, wherein the minimum performance condition is a minimum signal-to-interference-plus-noise-ratio (SINR) condition of uplink signals.

5. The operation method according to claim 1, wherein the configuring of the operating condition for the multi-agent deep reinforcement learning comprises:

configuring the each beam controller of the satellite to use the interference power between terrestrial cells, which is observed for the beam managed by the each beam controller, as the state constituting the operating condition;

allowing the each beam controller of the satellite to perform an operation of allocating one frequency resource among frequency resources allowed for the satellite as the action constituting the operating condition, so as to achieve the learning objective constituting the operating condition under the state; and configuring the learning objective constituting the operating condition so that the higher reward is obtained as the cumulative interference to the terrestrial system is reduced according to the action.

6. The operation method according to claim 5, further comprising configuring a penalty to be given when the action does not satisfy a minimum performance condition of the non-terrestrial network as the learning objective constituting the operating condition.

7. The operation method according to claim 1, further comprising modifying, by the each beam controller of the satellite, a policy by updating weights of a neural network of the each beam controller.

8. A satellite of a non-terrestrial network, comprising a processor, wherein the processor causes the satellite to perform:

determining a frequency resource allocation order for allocating frequency resources to beams in consideration of a frequency band of a terrestrial system and degrees of interference to the terrestrial system;

configuring a minimum performance condition for maintaining a service of the non-terrestrial network, the minimum performance condition being applied to each of the beams;

configuring an operating condition of a multi-agent deep reinforcement learning for each beam controller of the satellite; and controlling the each beam controller to sequentially allocate the frequency resources to a managed beam according to the frequency resource allocation order while considering the minimum performance condition, wherein the operating condition includes a state and a learning objective, the state is set based on an interference power observed between terrestrial cells for the managed beam by the each beam controller, and the learning objective is configured such that a higher reward is obtained as a cumulative interference to the terrestrial system is reduced according to an action.

9. The satellite according to claim 8, wherein in the determining of the frequency resource allocation order, the processor further causes the satellite to perform:

calculating a distance between a cell center of the terrestrial system and a cell center of a terrestrial cell formed by each of the beams; and determining the frequency resource allocation order in consideration of a level at which the distance affects the degree of interference.

10. The satellite according to claim 8, wherein in the configuring of the operating condition for the multi-agent deep reinforcement learning, the processor further causes the satellite to perform:

configuring the each beam controller of the satellite to use the interference power between terrestrial cells, which is observed for the beam managed by the each beam controller, as the state constituting the operating condition;

allowing the each beam controller of the satellite to perform an operation of allocating one frequency resource among frequency resources allowed for the satellite as the action constituting the operating condition, so as to achieve the learning objective constituting the operating condition under the state; and configuring the learning objective constituting the operating condition so that the higher reward is obtained as the cumulative interference to the terrestrial system is reduced according to the action.

11. The satellite according to claim 10, wherein the processor further causes the satellite to perform: configuring a penalty to be given when the action does not satisfy a minimum performance condition of the non-terrestrial network as the learning objective constituting the operating condition.

12. The satellite according to claim 8, wherein the processor further causes the satellite to perform: modifying, by the each beam controller of the satellite, a policy by updating weights of a neural network of the each beam controller.

* * * * *